Jan. 21, 1969          P. VALENTI          3,422,696
DOUBLE BALL NUT AND SCREW ACTUATOR
Filed March 27, 1964          Sheet 1 of 2
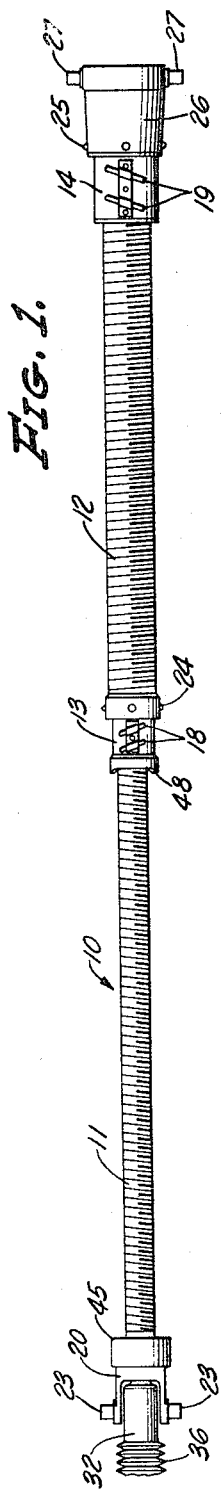
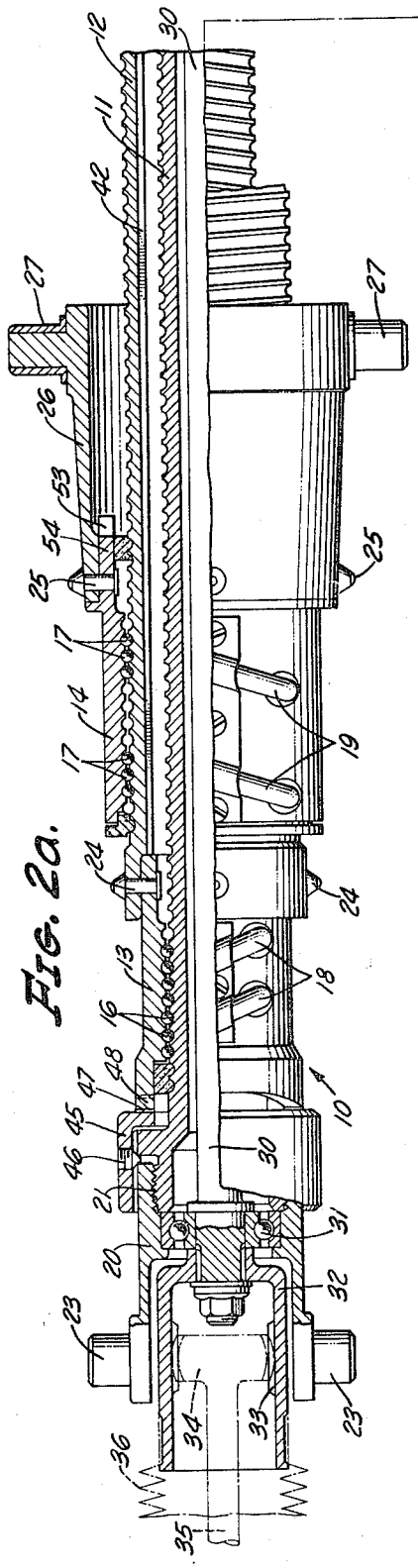
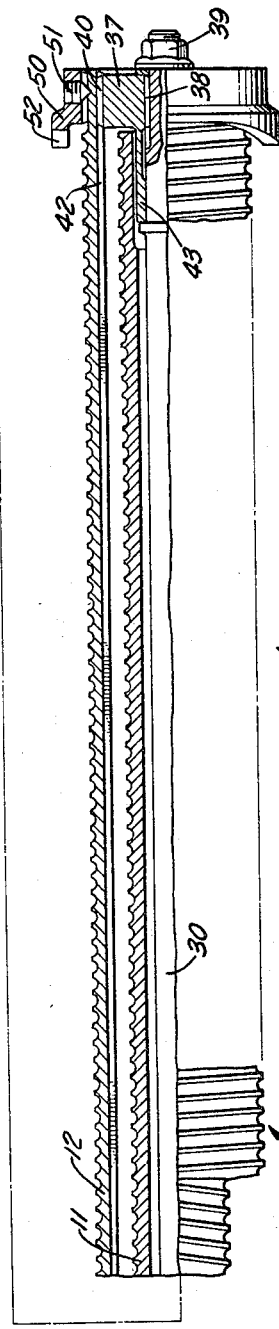
INVENTOR.
PETER VALENTI
BY Lyon & Lyon
ATTORNEYS

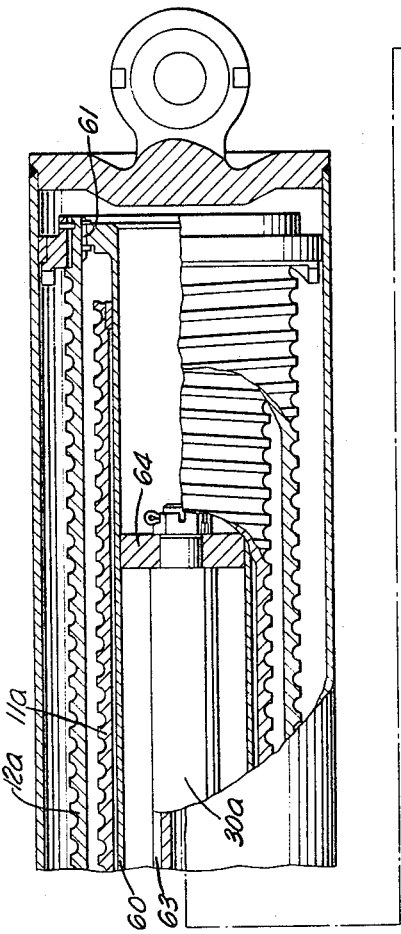
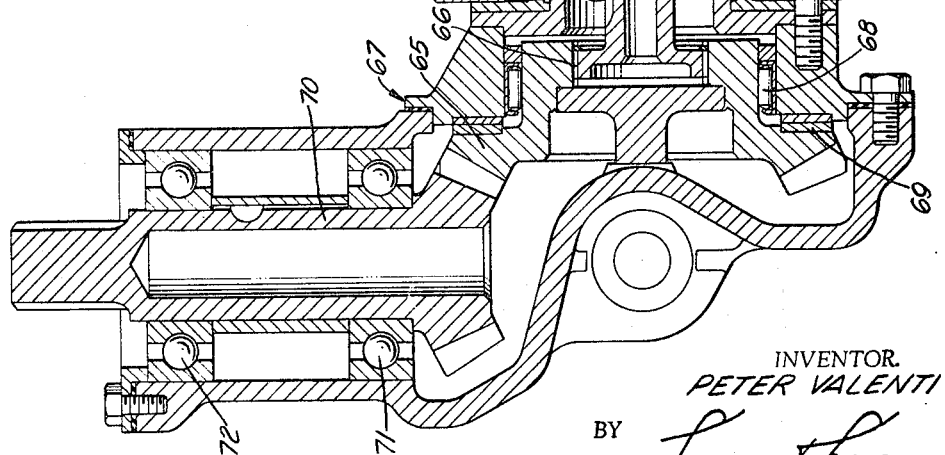

3,422,696
DOUBLE BALL NUT AND SCREW ACTUATOR
Peter Valenti, Whittier, Calif., assignor to Sargent Engineering Corporation, Huntington Park, Calif., a corporation of California
Filed Mar. 27, 1964, Ser. No. 355,378
U.S. Cl. 74—424.8    7 Claims
Int. Cl. F16h 1/18

This invention relates to extensible actuators of the screw and nut type. A device of this general type is shown in my prior patent, No. 2,907,223, granted Oct. 6, 1959. The present invention will be described in connection with ball screw actuators, but this is by way of illustration and not of limitation.

The principal object of this invention is to provide an extensible screw actuator having a relatively long operating stroke and a relatively short over-all length when retracted.

Another object is to provide a device of this type having a pair of screws mounted in coaxial telescopic relation, each with its own co-operating nut.

Another object is to provide a device of this type in which a nonrotary screw co-operates with a rotary nut and in which a rotary screw co-operates with a nonrotary nut, the rotary screw being driven by a shaft extending coaxially through the nonrotary screw.

Other and more detailed objects and advantages will appear hereinafter.

In the drawings:

FIGURE 1 shows a preferred embodiment of this invention, the parts being in fully extended position.

FIGURES 2a and 2b show the same device on an enlarged scale and partly in axial section, the parts being in fully retracted position. FIGURE 2b is a continuation of the right-hand end of FIGURE 2a.

FIGURES 3a and 3b are similar to FIGURES 2a and 2b, showing a modification.

Referring to the drawings, the telescopic ball screw actuator generally designated 10 includes a hollow, left-hand screw 11 and a hollow, right-hand screw 12 telescopically mounted on a common axis. A left-hand rotary nut 13 co-operates with the nonrotary screw 11, and a right-hand nonrotary nut 14 co-operates with the rotary screw 12. Balls 16 are interposed between the screw 11 and nut 13, and balls 17 are interposed between the screw 12 and nut 14. The nuts 13 and 14 include conventional tube returns 8 and 19, respectively.

The nonrotary screw 11 is fixed to the support member 20 by means of threads 21, and this support member is provided with trunnions 23 for engagement with another member, not shown. The engagement prevents rotation of the support member 20. The nut 13 is fixed by radial pins 24 into one end of the rotary screw 12, so that the nut 13 and the screw 12 turn as a unit. The nonrotary nut 14 is fixed by pins 25 to the driven member 26 having trunnions 27. The trunnions 27 engage a work member, not shown, which serves to prevent rotation of the member 26 and nut 14.

A drive shaft 30 extends axially to the hollow interior of the nonrotary screw 11 and is rotatably mounted on the support member 20 by means of the antifriction bearing assembly 31. The drive shaft 30 is turned by means of a member 32 having internal gear teeth 33. These internal gear teeth 33 are adapted to be driven by a driving gear 34 on shaft 35. A protecting bellows 36 is provided to exclude foreign matter.

The end of the drive shaft 30 remote from the support member 20 carries a drive element 37, which is fixed to the shaft 30 by means of a key 38 and a clamping nut 39. The element 37 carries a plurality of external splines 40, which engage within mating internal axial splines 42, provided on the inner surface of the hollow screw 12. A hub 43 on the element 37 provides a loose bearing support for the end of the screw 11 remote from the support member 20.

Means are provided for limiting the axial travel of the rotary nut 13 toward the support member 20, and as shown in the drawings this means includes a ring 45 fixed to the screw 11 and support member 20 by means of the set screw 46. This ring 45 is provided with jaws having axially extending radial surfaces 47. Co-operating jaws 48, having similar faces, are provided on one end of the rotary nut 13. The axial faces on these jaws co-operate to stop relative turning motion between the nut 13 and the screw 11, at the end of axial travel of the nut 13 towards the stationary member 20.

In a similar manner, means are provided for limiting axial travel of the nut 14 in a direction away from the support member 20, and, as shown in the drawings, this means includes a ring 50 fixed to the end of the rotary screw 12 by means of the set screw 51. The ring 50 is provided with jaws having axially extending radial faces 52, which co-operate with similar faces 53 provided on jaws 54, carried on the nonrotary nut 14. Engagement of the faces 52 and 53 serves to prevent relative rotary movement between the screw 12 and the nut 14 at the end of axial travel of the nut 14 in a direction away from the support member 20.

In operation, turning of the drive shaft 30 causes the element 37 to rotate the screw 12 through the spline connection 40, 42. This rotary movement of the screw 12 causes the attached nut 13 to rotate relative to the screw 11. The screw 11 does not turn because it is secured to the support member 20. Accordingly, the rotary nut 13 travels axially along the nonrotary screw 11. At the same time, rotation of the screw 12 causes the nonrotary nut 14 to travel axially along the screw 12. The nut 14 does not rotate because it is held from rotation by means of the driven member 26. The result is that turning of the central drive shaft 30 causes relative turning movement between each nut and its respective cooperating screw. Turning of the shaft 30 in one direction causes the assembly to extend, and turning in the other direction causes the assembly to retract. Extending movement of the assembly is limited by engagement of the jaw faces 52 and 53, and retracting movement of the assembly is limited by engagement of the jaw faces 47 and 48.

In a modified form of the invention shown in FIGURES 3a and 3b, the left-hand screw 11a co-operates with the left-hand rotary nut 13a, and the right-hand screw 12a co-operates with the right-hand nonrotary nut 14a, in the manner previously described. Balls 16a are interposed between the screw 11a and nut 13a, and balls 17a are interposed between the screw 12a and nut 14a. However, the rotary screw 12a does not have any internal splines, and, instead, it is rotated by means of a tube 60 and driving connection 61. A ball spline assembly 62 at the other end of the tube 60 from the driving connection 61 engages external axial splines 63 on the outer surface of the driveshaft 30a. A bronze collar 64 secured on the extending end of the driveshaft 30a provides a sliding support for the inner surface of the tube 60.

When the driveshaft 30a is rotated, the tube 60 is turned in the same direction and at the same speed through the ball spline assembly 62. The tube 60 drives the rotary screw 12a through the connection 61, thereby causing relative axial movement between the screw 12a and the nut 14a, as well as between the screw 11a and the nut 13a. Limit stop devices are provided to limit axial travel of the over-all assembly in either direction, as previously described.

The driveshaft 30a is driven by gear 65 through spline connection 66. This gear 65 is rotatably mounted within stationary housing 67 by means of bearings 68 and 69. Gear 65 is driven from gear 70 which is also mounted within the housing 67 and rotatably supported by bearings 71 and 72.

Having fully described my invention, it is to be understood that I am not to be limited to the details herein set forth, but that my invention is of the full scope of the appended claims.

I claim:

1. In a ball screw actuator, the combination of: a support member, a hollow nonrotary screw fixed at one end to said support member, a rotary nut mounted to turn on said screw, a hollow rotary screw secured to turn with said rotary nut, said screws being coaxial and telescopically arranged, one having a right-hand helix and the other having a left-hand helix, a nonrotary nut mounted on said rotary screw, means for restraining said nut from rotation, balls interposed between each of said screws and its respective nut, a drive shaft rotatably mounted on the support member and extending through said nonrotary screw, a spline drive element fixed on the driveshaft remote from said support member, an axial internal spline element on said rotary screw slidably engaged by said spline drive element, whereby rotation of the driveshaft causes simultaneous axial travel of each nut upon its respective screw, each nut having an axial length materially shorter than its respective screw whereby both screws project beyond both nuts when the drive shaft is turned to retract said nuts, and stop means for limiting axial travel of one of the nuts in one direction and of the other nut in the other direction.

2. In a ball screw actuator, the combination of: a support member, a hollow nonrotary screw fixed at one end to said support member, a rotary nut mounted to turn on said screw, a hollow rotary screw secured to turn with said rotary nut, said screws being coaxial and telescopically arranged, one having a right-hand helix and the other having a left-hand helix, a nonrotary nut mounted on said rotary screw, means for restraining said nut from rotation, balls interposed between each of said screws and its respective nut, a drive shaft rotatably mounted on the support member and extending through said nonrotary screw, a spline drive element fixed on the driveshaft remote from said support member, an axial internal spline element on said rotary screw slidably engaged by said spline drive element, whereby rotation of the driveshaft causes simultaneous axial travel of each nut upon its respective screw, each nut having an axial length materially shorter than its respective screw whereby both screws project beyond both nuts when the drive shaft is turned to retract said nuts, and stop means including co-operating axial faces on the rotary nut and the support member and co-operating axial faces on the nonrotary nut and the rotary screw for limiting axial travel of each of the nuts.

3. In an extensible actuator, the combination of: a support member, a hollow nonrotary screw fixed at one end to said support member, a rotary nut mounted to turn on said screw, a hollow rotary screw secured to turn with said rotary nut, a nonrotary nut mounted on said rotary screw, means for restraining said nut from rotation, a drive shaft rotatably mounted on the support member and extending through said nonrotary screw, and means including a spline drive connection enabling the drive shaft to turn said rotary screw, said means including a tube encircled by the rotary screw, whereby rotation of the drive shaft causes simultaneous axial travel of each nut upon its respective screw, each nut having an axial length materially shorter than its respective screw whereby both screws project beyond both nuts when the drive shaft is turned to retract said nuts.

4. In an extensible actuator, the combination of: a support member, a hollow nonrotary screw fixed at one end to said support member, a rotary nut mounted to turn on said screw, a hollow rotary screw secured to turn with said rotary nut, a nonrotary nut mounted on said rotary screw, means for restraining said nut from rotation, a drive shaft rotatably mounted on the support member and extending through said nonrotary screw, a tube encircled by the rotary screw and encircling the drive shaft, means securing the tube to the rotary screw, and a spline drive connection between the tube and the drive shaft enabling the drive shaft to turn said rotary screw, whereby rotation of the drive shaft causes simultaneous axial travel of each nut upon its respective screw, each nut having an axial length materially shorter than its respective screw whereby both screws project beyond both nuts when the drive shaft is turned to retract said nuts.

5. In an extensible actuator, the combination of: a support member, a hollow nonrotary screw fixed at one end to said support member, a rotary nut mounted to turn on said screw, a hollow rotary screw secured to turn with said rotary nut, said screws being coaxial and telescopically arranged, one having a right-hand helix and the other having a left-hand helix, a nonrotary nut mounted on said rotary screw, means for restraining said nut from rotation, a drive shaft rotatably mounted on the support member and extending through said nonrotary screw, a tube encircled by the rotary screw and connected thereto, a spline drive connection between said tube and said drive shaft, whereby rotation of the drive shaft causes simultaneous travel of each nut upon its respective screw, each nut having an axial length materially shorter than its respective screw whereby both screws project beyond both nuts when the drive shaft is turned to retract said nuts.

6. In a ball screw actuator, the combination of: a support member, a hollow nonrotary screw fixed at one end to said support member, a rotary nut mounted to turn on said screw, a hollow rotary screw secured to turn with said rotary nut, said screws being coaxial and telescopically arranged, one having a right-hand helix and the other having a left-hand helix, a nonrotary nut mounted on said rotary screw, means for restraining said nut from rotation, balls interposed between each of said screws and its respective nut, a drive shaft rotatably mounted on the support member and extending through said nonrotary screw, the drive shaft having axially extending external spline means, a tube encircled by the rotary screw and having one end fixed to the screw, spline means on the tube remote from said end thereof engaging the external spline means on the drive shaft, whereby rotation of the drive shaft causes simultaneous axial travel to each nut upon its respective screw, each nut having an axial length materially shorter than its respective screw whereby both screws project beyond both nuts when the drive shaft is turned to retract said nuts, and stop means for limiting axial travel of one of the nuts in one direction and of the other nut in the other direction.

7. In a ball screw actuator, the combination of: a support member, a hollow nonrotary screw fixed at one end to said support member, a rotary nut mounted to turn on said screw, a hollow rotary screw secured to turn with said rotary nut, said screws being coaxial and telescopically arranged, one having a right-hand helix and the other having a left-hand helix, a nonrotary nut mounted on said rotary screw, means for restraining said nut from rotation, balls interposed between each of said screws and its respective nut, a drive shaft rotatably mounted on the support member and extending through said nonrotary screw, the drive shaft having axially extending external spline means, a tube encircled by the rotary screw and having one end fixed to the screw, spline means on the tube remote from said end thereof engaging the external spline means on the drive shaft, whereby rotation of the drive shaft causes simultaneous axial travel of each nut upon its respective screw, each nut having an axial length materially shorter than its respective screw whereby both screws project beyond both nuts when the drive shaft is turned to retract said nuts, and stop means including co-operating axial faces on the rotary nut and the support member co-operating axial faces on the nonrotary nut and the rotary screw for limiting axial travel of each of the nuts.

References Cited

UNITED STATES PATENTS

| | | | |
|---|---|---|---|
| 2,081,917 | 6/1937 | Gartin | 74—424.8 |
| 2,458,272 | 1/1949 | Jones | 74—424.8 X |
| 3,029,659 | 4/1962 | Geyer | 74—424.8 X |
| 2,907,223 | 10/1959 | Valenti | 74—424.8 |

DONLEY J. STOCKING, *Primary Examiner.*

LEONARD H. GERIN, *Assistant Examiner.*